(12) United States Patent
Mueller et al.

(10) Patent No.: US 6,920,423 B2
(45) Date of Patent: Jul. 19, 2005

(54) METHODS FOR SPEECH PROCESSING

(75) Inventors: Achim Mueller, Munich (DE);
Hans-Georg Zimmermann,
Starnberg/Percha (DE)

(73) Assignee: Siemens Aktiengesellschaft, Munich (DE)

( * ) Notice: Subject to any disclaimer, the term of this patent is extended or adjusted under 35 U.S.C. 154(b) by 588 days.

(21) Appl. No.: 09/960,731

(22) Filed: Sep. 24, 2001

(65) Prior Publication Data

US 2002/0055838 A1 May 9, 2002

(30) Foreign Application Priority Data

Sep. 22, 2000 (DE) .......................................... 100 47 172

(51) Int. Cl.$^7$ ............................................. G10L 15/00
(52) U.S. Cl. ...................................... 704/232; 704/235
(58) Field of Search ................................. 704/232, 235, 704/256

(56) References Cited

U.S. PATENT DOCUMENTS

| | | | | |
|---|---|---|---|---|
| 4,912,655 A | * | 3/1990 | Wood .......................... | 706/25 |
| 5,398,300 A | * | 3/1995 | Levey .......................... | 706/16 |
| 5,479,563 A | | 12/1995 | Yamaguchi | |
| 5,732,388 A | | 3/1998 | Hoege et al. | |
| 6,029,135 A | | 2/2000 | Krasle | |
| 6,216,048 B1 | * | 4/2001 | Keeler et al. .................. | 700/44 |
| 6,581,048 B1 | * | 6/2003 | Werbos ........................ | 706/23 |

OTHER PUBLICATIONS

A. Krogh et al., "A Simple Weight Decay can Improve Generalization", Advances In Neural Information Processing Systems 4, 1995, pp. 950–957.

G. P. Sonntag et al., "Prosody Generation with an Neural Network: Weighing the Importance of Input Parameters", 1997 IEEE International Conference on Acoustics, Speech, and Signal Processing, 1997, pp. 931–934.

Ralf Haury et al., "Optimization of a Neural Network for Speaker and Task Dependent $F_0$–Generation", Proceedings of the 1998 IEEE International Conference on Acoustics, Speech, and Signal Processing, 1998, pp. 297–300.

C. Erdem et al., "Soft Input Feature Selection within Neural Prosody Generation", Speech Prosody 2002, Apr. 13, 2002, 4 pages.

Hirschberg et al., "Training Intonational Phrasing Rules Automatically for English and Spanish Text–to–Speech", Speech Communication 18, 1996, pp. 281–290.

Wang et al., "Automatic Classification of Intonational Phrase Boundaries", Computer Speech and Language 6, 1992, pp. 175–196.

Black et al., "Assigning Phrase Breaks from Part–of–Speech Sequences", Eurospeech, 1997.

Muller et al., "Robust Generation of Symbolic Prosody by a Neural Classifier Based on Autoassociators", ICASSP, 2000.

Hirschberg, "Pitch Accent in Context Predicting Intonational Prominence From Text", Artifical Intelligence 63, 1993, pp. 305–340.

Widera et al., "Prediction of Word Prominence", Eurospeech, 1997.

Sonntag et al., "Prosody Generation with a Neural Network: Weighing the Importance of Input Parameters", ICASSP, 1997.

Jianhua et al., "A Neural Network Based Prosodic Model of Mandarin TTS System", ICSLPS, 2000.

* cited by examiner

*Primary Examiner*—Daniel Abebe
(74) *Attorney, Agent, or Firm*—Staas & Halsey LLP

(57) ABSTRACT

The invention relates to a method for speech processing in which input variables containing speech features are mapped onto output variables. In the mapping process, the input variables are weighted and/or identical maps are produced for different sets of input variables and at least one output variable.

27 Claims, 3 Drawing Sheets

METHODS FOR SPEECH PROCESSING

BACKGROUND OF THE INVENTION

1. Field of the Invention

The invention relates to speech processing based primarily on data-driven modules.

2. Description of the Related Art

Methods and systems for speech processing are known, for example, from U.S. Pat. Nos. 6,029,135, 5,732,388 and German Patentschrift Nos. 19636739 C1 and 19719381 C1. The implementation of multilingual and speech-space-independent speech synthesis systems is, in particular, based primarily on data-driven modules. These modules, for example prosody generation modules, generally use learning methods. In general, the learning methods can be used well for a number of languages and applications. However, the input variables often need to be optimized laboriously by hand.

The following learning techniques have been used for the case of symbolic prosody, that is to say in particular for phrase boundary prediction and to predict accented words, for example by appropriate fundamental frequency production: phrase boundary prediction is carried out on the basis of rules based on classification and regression trees (CARTs) from Julia Hirschberg and Pilar Prieto: "Training Intonational Phrasing Rules Automatically for English and Spanish Text-to-speech", Speech Communication, 18, pages 281–290, 1996, and Michell Q. Wang and Julia Hirschberg: "Automatic Classification of Intonational Phrasing Boundaries" Computer Speech and Language, 6, pages 175–196, 1992, and rules which are based on Hidden Markov models (HMM) from Alan W. Black and Paul Taylor: "Assigning Phrase Breaks from Part-of-Speech Sequences", Eurospeech, 1997, and rules which are based on neural networks from Achim F. Müller, Hans Georg Zimmermann and Ralf Neuneier: "Robust Generation of Symbolic Prosody by a Neural Classifier Based on autoassociators", ICASSP, 2000. CARTs were used by Julia Hirschberg for the prediction of accents or accented words: "Pitch Accent in Context: Predicting Prominence from Text", Artificial Intelligence, 63, pages 305–340, 1993, while, in contrast, neural networks have been used by Christina Widera, Thomas Portele and Maria Wolters: "Prediction of Word Prominence", Eurospeech 1997. Interpretation of the influence of the input variables used is generally impossible in this case. This applies in particular to neural networks. This problem is also known for the case of fundamental frequency production (f0 generation). Thus, for example, the input variables are optimized heuristically in Gerit P. Sonntag, Thomas Portele and Barbara Heruft: "Prosody Generation with a Neural Network: Weighing the Importance of Input Parameters", ICASSP, 1997.

SUMMARY OF THE INVENTION

Against this background, the invention is based on an object of improving speech processing methods such that greater consideration is given to the important input variables when mapping input variables containing speech features onto output variables. Furthermore, it is intended to specify a method, a system and a computer program product in which the mapping of the input variables onto the output variables can be determined more accurately and more quickly.

According to the present invention, the input variables are mapped onto the output variables that are produced, using different weights. The weights allow the importance of individual input variables to be taken into account. The weights can in this case be constructed in any desired form, for example by multiplication by a factor, by addition of a summand or by any desired function which modifies the input variable appropriately when applied to it.

Further according to the invention, the weights are no longer found heuristically and, instead of this, the map of the output variable that is produced (actual state) is compared with the map of the output variable to be produced (nominal state). This is used to calculate a change rule for the map, with this change rule being calculated with the provision, that is to say quite deliberately, such that the weights of input variables which have little influence on the output variable are reduced. Little influence means that the input variable contains little relevant information. Such little influence occurs, for example, when a major change in the input variable produces only a minor change in the output variable, or the output variable changes to a major extent even though the input variable remains constant.

In particular, it is advantageous to reduce the weights as a function of the value of other weights. This is due to the fact that the major factor is not the absolute magnitude of the weights, but the relevant weighting of the input variables with respect to one another. The other weights can in this case be considered selectively or completely. Integration over the other weights is in this case just as feasible as averaging. Depending on how pronounced the weights are, it is also possible to consider only their magnitudes, for example by squaring them.

The reduction in the weights can easily be controlled by using a reduction rate which can be predetermined. It is thus advantageous to include such a reduction rate in the method.

If the map contains a number of map layers, for example in the form of a number of functions linked to one another, or else in the form of layers in a neural network, then the weighting process is preferably carried out in the first map layer. This gives the results which can be interpreted best.

In particular, an input variable is weighted before it is used for calculation in conjunction with that of another input variable. To reduce the computation requirement, weights which are below a specific threshold value can be set to zero. This means that the associated input variable is no longer considered in the map.

What are referred to as spurious values in the input variables, which have particularly high values, can be suppressed by the map for the corresponding input variable having a transfer function which has a low gradient for large-magnitude values of the input variable.

To ensure that the spurious values have only a minor influence on the rest of the map, this transfer function is preferably applied to the input variables first of all, that is to say it is applied to the map even before the remaining parts. A sigmoid transfer function, such as the hyperbolic tangent or the logistic function, is particularly suitable for use as the transfer function.

The map may be entirely or partially in the form of a neural network. In this case, the input variables are linked via synthetic neurons to the at least one output variable produced by the map. In this refinement, the weights can be identified by the weights in the neural network. The generalization capability of a neural network is improved, in particular, by reducing weights for input variables which have little influence on the output variables. If the neural network is trained using a learning method, then the comparison of the output variable that is produced with the output variable to be produced, and the calculation of the change rule from the comparison are preferably carried out repeatedly with the provision that the weights of input variables which have little influence on the output variable are reduced, and so this results in the iterative production of a map in which the output variables that are produced correspond to an ever increasing extent to the output variables to be produced, and the weights of those input variables which have little influence on the output variable are reduced further.

It is particularly preferable for this method to be carried out with a number of sets of input variables containing speech features and with sets, which are respectively associated with these sets, of at least one output variable to be produced. This allows the map to be refined further, and the neural network to be trained better.

If there are a number of sets of input variables each having identical input variables, at least one output variable to be produced and, in a corresponding manner, a number of maps, then the method can be improved by the change rules for the individual maps being calculated such that they result in the same maps for different sets of input variables. This is because, if the sets have input variables that are identical, the maps onto the at least one output variable to be produced by the maps or one of the maps must be identical. This can be achieved, for example, by all the maps being initialized such that they are identical, or virtually identical, and by then also applying only identical change rules to all the maps.

Identically initialized change rules result in identical change rules for all the maps, for example by first of all calculating provisional change rules, during whose calculation only one individual set of input variables, the associated map, the output variable that is produced and the output variable to be produced are considered. These provisional change rules are calculated for all the predetermined sets. The mean values of the provisional change rules are then determined. These result in the change rules which are then actually used to change the maps.

In this method as well, it is advantageous to use transfer functions to damp out spurious values, and to use neural networks with synthetic neurons and weights. These refinements are described in the dependent claims.

To save memory space, the identical maps are preferably stored at the same memory location. Furthermore, the maps may have one or more common map parts.

In addition, the steps of comparing the output variables produced from the maps with the output variables to be produced from the maps, and the steps of calculating the change rules for the maps from the comparison, so that they result in the same maps for different sets of input variables, are carried out repeatedly. The map with the least error can thus be determined iteratively.

The aim of the invention is not only to calculate one or more maps in the described manner, but, furthermore, also to apply the maps to input variables whose output variables to be produced by the map are unknown. This is done by a method which uses a map produced in the manner described above.

A system which is set up to carry out one of the described methods can be produced, for example, by appropriate programming of a computer or a computation system.

The described methods can be carried out on a computer by suitable implementation of one of the methods as software code in a programming language stored on a computer readable medium. The software code may exist in any desired form, for example on paper, on computer-legible data storage media, or may be distributed via a network.

BRIEF DESCRIPTION OF THE DRAWINGS

Further major features and advantages of the invention will become evident from the description of an exemplary embodiment based on the drawing, in which.

DETAILED DESCRIPTION OF THE PREFERRED EMBODIMENTS

Figure 1:
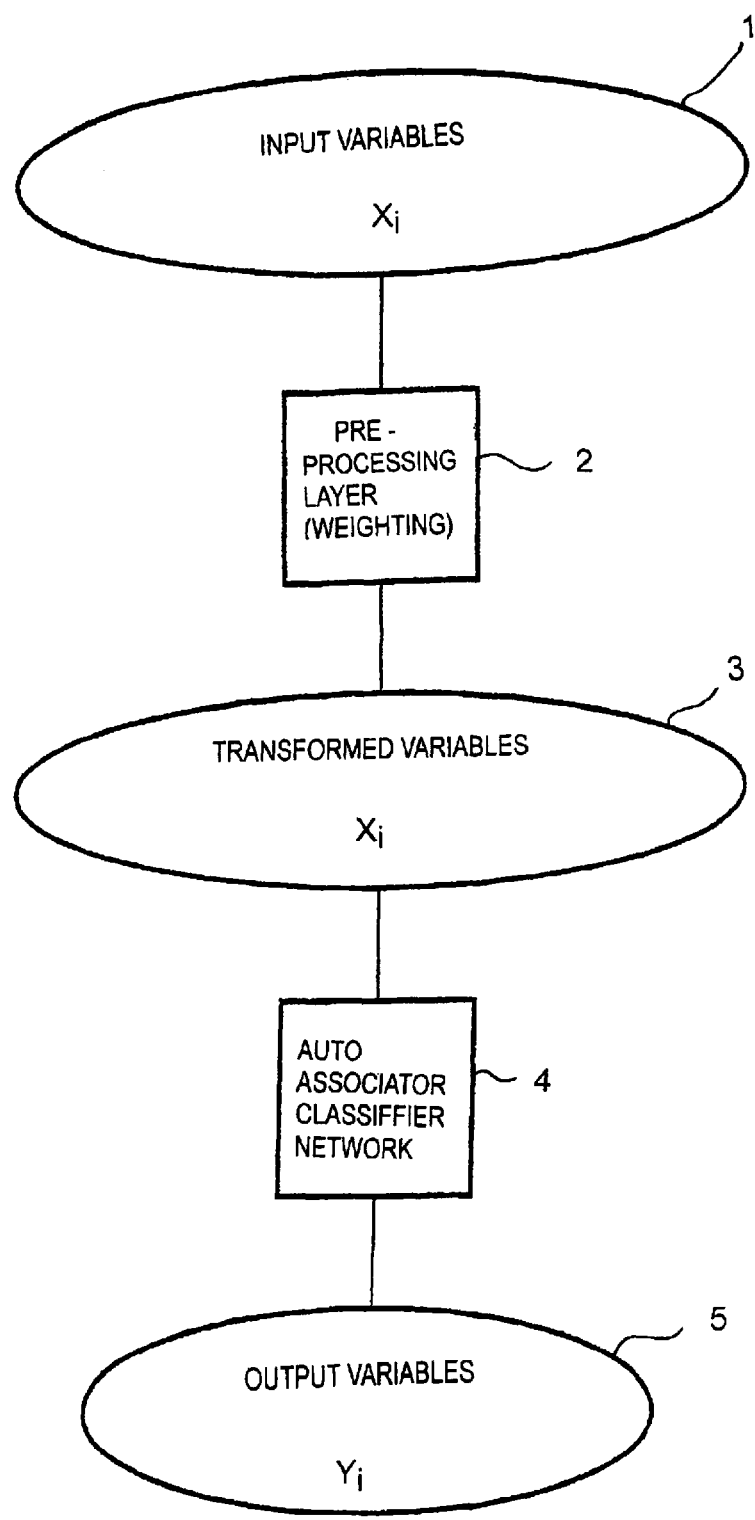
FIG. 1 is a flowchart of a method for speech processing.

FIG. 1 shows the architecture of a method for speech processing. In this case, input variables $x_i$ containing I speech features are supplied in the form of an input vector x via an input 1 to the method. The input variables are weighted via a preprocessing layer 2, and are mapped onto transformed input variables $x_i'$ in the form a vector. The transformed input variables $x_i'$ are emitted at the output 3 of the preprocessing layer 2, and are supplied to an autoassociator classifier network 4. The design of such an autoassociator classifier network is described, for example, in Achim F Müller, Hans Georg Zimmermann and Ralf Neuneier: "Robust Generation of Symbolic Prosody by a Neural Classifier Based on Autoassociators", ICASSP, 2000. The autoassociator classifier network 4 is used to map the transformed input variables $x_i'$, and hence the input variables $x_i$ as well, onto the output variables $y_i$ that are produced. Finally, the output variables $y_i$ are emitted at the output 5.

In the exemplary embodiment illustrated in FIG. 1, the map 2, 4 thus includes a preprocessing stage 2 and an autoassociator classifier network 4. Alternatively, the tasks associated to the preprocessing stage 2 and described in the following text can, however, also be assigned to the autoassociator classifier network 4. Furthermore, this need not be in the form of an autoassociator classifier network 4, either, but, depending on the problem to be solved by the speech processing, it is also possible to use other neural networks with different network architectures. Furthermore, apart from neural networks, it is also possible to use other suitable maps, particularly if they can be trained by learning methods.

To find out which of the I input variables $x_i$ is important for the specific speech-processing objectives, the preprocessing layer 2 is arranged between the input 1 and the autoassociator classifier network 4. The I input variables $x_i$ are passed through a diagonal matrix $w_{diag}=\text{diag}(w_1 \ldots w_i)$ in this preprocessing layer 2, so that the transformed input variables $x'_i$ are produced at the output 3 of the preprocessing layer 2.

The reduction in the weights in the illustrated exemplary embodiment is applied only to the weights of the diagonal matrix $w_{diag}$. The identity function or the hyperbolic tangent is selected as the activation function for this purpose for the neurons in the preprocessing layer 2.

At the start of the training phase, all the elements in the diagonal matrix $w_{diag}$, that is to say all the weights $w_i$, are initialized with 1. The input variables $x_i$ are thus transferred to the autoassociator classifier network 4 without any modification.

The method described in the following text is now used to reduce the weights $w_i$ of the input variables $x_i$ which have little influence on the output variables $y_i$. A penalty term P(w) is added to an error function F(w) for the preprocessing layer 2:

$$\tilde{F}(w) = F(w) + \lambda \cdot P(w)$$

In this case, the influence of the penalty term P(w) can be set via the reduction rate $\lambda$, which can be predetermined. One possible choice for the penalty term P(w) is $$P(w) = \sum_k w_k^2, \text{ where } k = 1 \ldots l.$$

Thus, the error function $\tilde{F}(w)$, with the penalty term P(w) added to it, becomes:

$$\tilde{F}(w) = F(w) + \lambda \sum_k w_k^2.$$

During the learning phase, the weights relating to each iteration step j are trained using the gradient descent method on the basis of this expanded error function:

$$\tilde{w}^{j+1} = \tilde{w}^j - \eta \nabla \tilde{F}(w)$$
$$= \tilde{w}^j - \nabla \left[ \eta F(w) + \eta \lambda \sum w_k^2 \right].$$

This is the change rule for the weights in the preprocessing stage. The parameter $\eta$ is normally referred to as the learning rate, and controls the step width which is used for adaptation of the weights. The learning rate $\eta$ and the reduction rate $\lambda$ are preferably kept constant in all the steps.

It has been found to be important for the reduction rate $\lambda$ to be chosen with care. The reduction rate $\lambda$ should normally be chosen to be as small as possible. The influence of the learning rate $\eta$ in the change rule which is applied to the weights in the preprocessing stage 2 is thus greater than the influence of the reduction rate $\lambda$. It is thus possible to cover non-linear relationships which are concealed in the data. On the other hand, the reduction rate $\lambda$ should be sufficiently large that it influences the weights $w_i$ in the diagonal matrix $w_{diag}$ in the preprocessing stage 2.

After a number of training epochs and applications of the change rule to the weights $w_i$, the following behavior can be observed: for a number of weights, the influence of the learning rate $\eta$ is greater than the influence of the reduction rate $\lambda$. However, for other weights, the influence of the reduction rate is greater than the influence of the learning rate $\eta$. Correct choice of the ratio of the reduction rate $\lambda$ to the learning rate $\eta$ allows a number of weights to be reduced to zero, or virtually to zero, while other weights retain a magnitude which is not negligible. The weights close to zero or below a specific threshold value are regarded as less important for training success of the autoassociator classifier network 4. All the weights in the autoassociator classifier network are trained without any penalty term P(w), at the same time as the weights in the preprocessing stage 2.

The concept of adding a preprocessing stage 2, which connects the input 1 via the output 3 of the preprocessing stage 2 to the neural autoassociator classifier network 4, is applied by the described method to the analysis of word categories (parts of speech), which are arranged in word category sequences (part of speech sequences), as input variables $x_i$. This allows the influence of specific word categories on the phrase boundary prediction and/or the fundamental frequency production and, in particular, the required size for the context window to be calculated. The context window governs how many sets of input variables $x_i$ in the form of word categories must be considered for the symbol prosody. One set of input variables is in this case formed by all the input variables $x_i$ which are present at the same time t. A sequence of sets of input variables thus forms a time series for these word categories.

Figure 2:
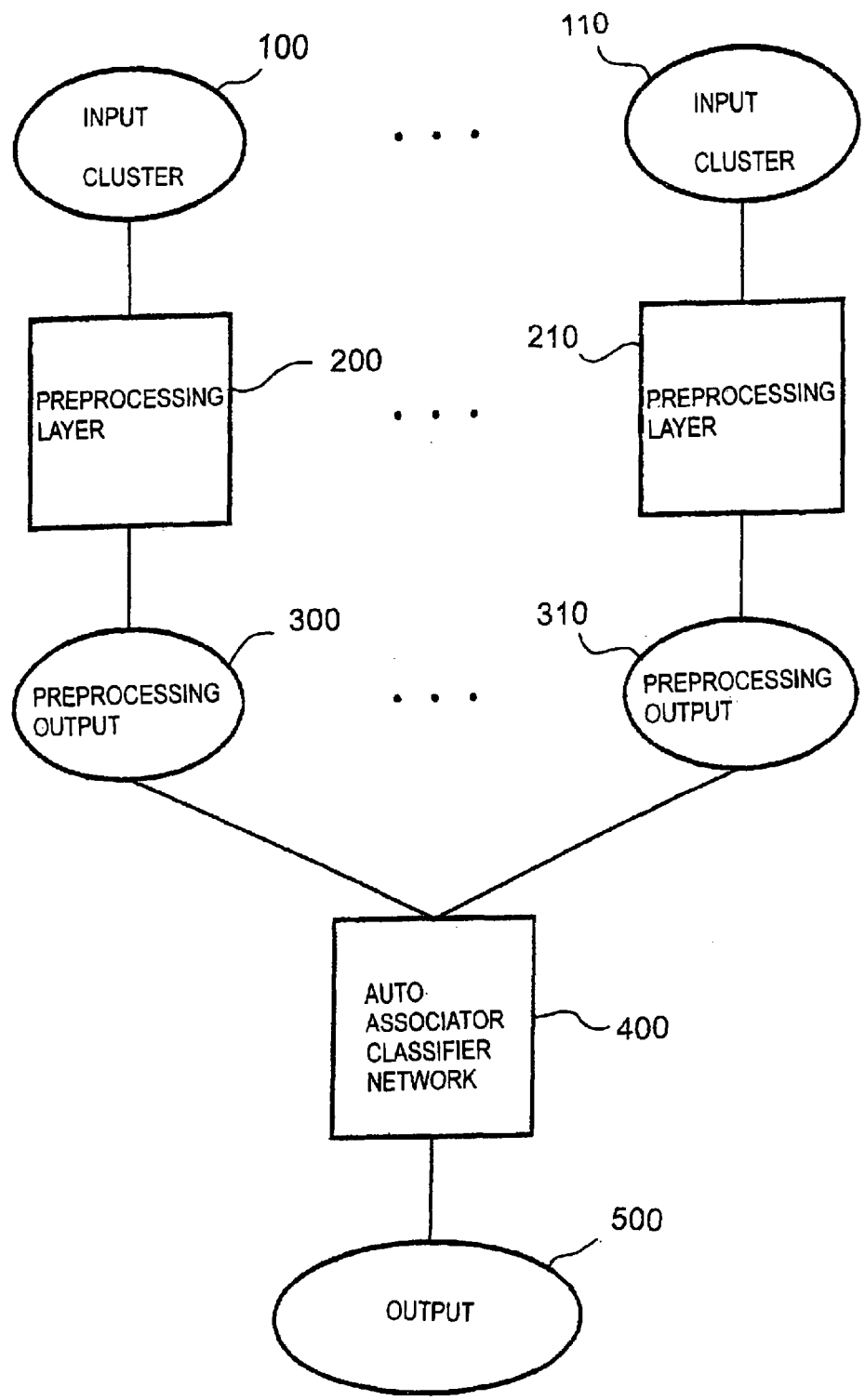
FIG. 2 is a flowchart of a method for speech processing, with a number of sets of input variables.

FIG. 2 shows an architecture for the method for speech processing, which can advantageously be used when a number of sets of input variables are present which each contain identical input variables. This is the situation, for example, with the time series just described. In this case, the input 100–110 is in the form of input clusters, so that each cluster is responsible for one set of input variables. In the illustrated example, one set of input variables is formed in the context window by the respective input variables associated with one time. In the exemplary embodiment, five time steps before and five time steps after the present time were taken into account for the context window. Each set of input variables contains 35 word categories as input variables. These 35 word categories are identical from set to set. The input variables are passed in clusters through appropriate preprocessing layers 200–210, each of whose designs corresponds to the preprocessing layer from the previous exemplary embodiment, to the outputs 300–310 of the preprocessing layers 200–210. From here, they pass to a common autoassociator classifier network 400, from which they are emitted at the output 500. The autoassociator classifier network 400 is a common and identical map part of all maps.

It is now essential that the diagonal matrices of weights used in the preprocessing layers 200 to 210 are not calculated independently of one another. In fact, the change rules for these matrices are calculated such that they result in the same maps for different sets, in particular all the sets, of input variables. To this end, provisional change rules are first of all calculated for the weights applied in the preprocessing layers 200–210, by calculating, independently of one another, the change rules for each set of input variables and the respective part, which is arranged in one of the preprocessing layers 200–210, of the respectively associated map. After this, the mean value of the provisional change rules is formed, and this results in a common change rule which is then applied to the weights in all the preprocessing layers 200–210. If the mutually corresponding weights in the preprocessing layers 200–210 have been initialized to be the same, then this procedure results in the change rules for these weights being calculated such that they result in the same maps for the various sets of input variables.

Figure 3:
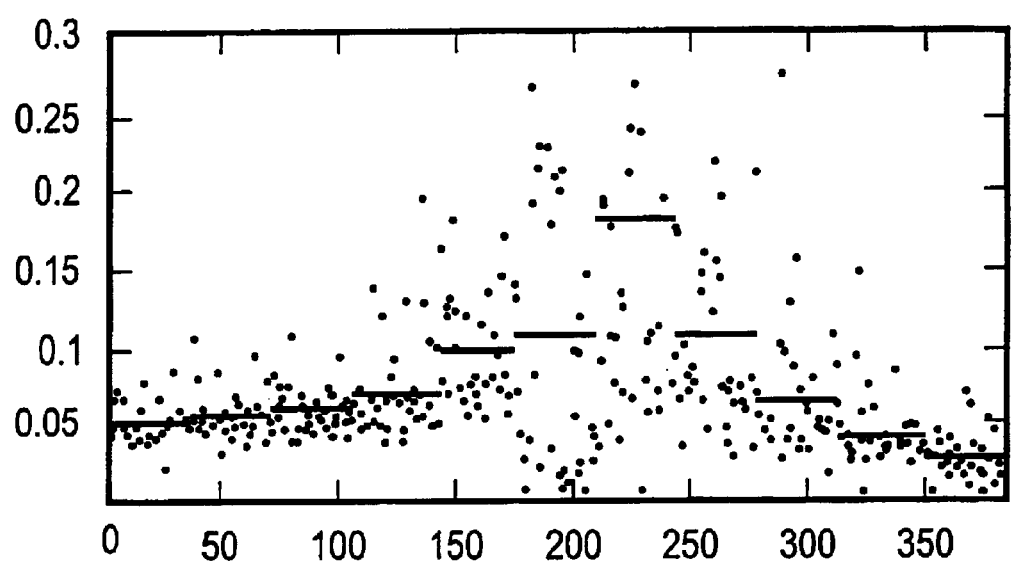
FIG. 3 shows the weights calculated using a number of sets of input variables by a method for speech processing in accordance with the present invention.

The results from experiments to determine the size of the context window for phrase boundary prediction are shown in FIG. 3. FIG. 3 shows the values of the weights $w_i$ in the diagonal matrix $w_{diag}$. In this case, 35 word categories are taken into account in each time step. The number of time steps is 11, as stated above. The mean value of the weights in each time step is in each case represented by a horizontal bar. The bar for the center of the phrase boundary context window is shown in bold. As can be seen, the position to the right alongside the center of the phrase boundary context window, that is to say the position at the time immediately after the phrase boundary, is that having the larger mean value. This means that this is the most important for phrase boundary prediction. Furthermore, it can be seen that the positions which are further away than two time steps from the center have low mean values, and are thus not relevant for phrase boundary prediction.

Since the weights of input variables which have little influence on the output variable are reduced, this results in particular in an increase in the generalization capability of the map that is used, and the effect of pure memorizing, which frequently occurs in neural networks, is precluded. The application of a map produced in this way to phrase boundaries that are to be predicted thus gives considerably better results than maps based on the prior art.

The method as shown in FIG. 1 can also be used for analysis of the influence of the input variables on fundamental frequency production. For this purpose, the autoassociator classifier network 4 in FIG. 1 is replaced by a neural network with standard architecture for producing the fundamental frequency of the speech to be investigated. A network such as this is described, for example, in Tao Jianhua, Cai Lianhong, Martin Holzapfel and Herbert Tropf: "A Neural Network based Prosodic Model of Mandarin TTS System", ICSLPS, 2000.

The method for analysis of the influence of the input variables on production of the fundamental frequency is analogous to the method for analysis of the required size of the phrase boundary context window for use in symbolic prosody. However, in this case, the input variables represent phonetic and linguistic information. In contrast to the word categories, these are in some cases not symbolic, but are in continuous form. In this case, it is possible for individual input variables to have spurious values, that is to say they can assume very large magnitude values, which interfere with the learning algorithm of a neural network that is to be trained. In order to prevent this, a transfer function for the map is preferably provided in advance, in order to damp out such spurious values. This can be provided, for example, by choosing the activation function in the preprocessing layer 2 to be a sigmoid function.

All the exemplary embodiments are based on the idea of achieving improved speech analysis, by automatically separating out unimportant speech features and reducing their influence on the prediction, or by jointly evaluating information present in time series. In this case, it is also within the scope of the invention to use the knowledge obtained for speech processing in that the map obtained by the method and by a system which is set up to carry out a corresponding method is used for speech synthesis and/or for voice recognition.

What is claimed is:

1. A method of speech processing, comprising:
    mapping input variables with different weights onto at least one output variable produced by said mapping;
    comparing the at least one output variable produced from said mapping with a desired output variable to be produced from said mapping to obtain a comparison result; and
    calculating a change rule for said mapping based on the comparison result and to reduce the weights of selected input variables having little influence on the at least one output variable.

2. The method as claimed in claim 1, wherein the change rule is at least partially calculated such that the weights of the selected input variables are reduced as a function of values of the weights of unselected input variables.

3. The method as claimed in claim 2, wherein the change rule is at least partially calculated such that the weights of the selected input variables are reduced by a value which is a function of a sum of squares of the weights of the unselected input variables.

4. The method as claimed in claim 1, wherein the weights of the selected input variables are reduced at a predetermined reduction rate.

5. The method as claimed in claim 1, wherein the map contains a number of map layers, starting with a first map layer and the weights are applied in the first map layer.

6. The method as claimed in claim 1, further comprising setting at least one of the weights with a value below a threshold value to zero.

7. The method as claimed in claim 1, wherein said mapping uses, for at least one of the input variables, a transfer function which has a low gradient for large-magnitude values of the at least one of the input variables.

8. The method as claimed in claim 7, wherein said mapping contains a number of map layers, starting with a first map layer, and the transfer function is provided in close proximity to the first map layer.

9. The method as claimed in claim 7, wherein the transfer function is a sigmoid transfer function.

10. The method as claimed in claim 1, wherein said mapping is applied by a neural network.

11. The method as claimed in claim 10, wherein the input variables are linked via synthetic neurons to the at least one output variable produced by said mapping.

12. The method as claimed in claim 10, wherein the weights are weights in the neural network.

13. The method as claimed in claim 1, further comprising iteratively repeating said comparing, calculating and mapping.

14. The method as claimed in claim 1, wherein said calculating of the change rule produces identical maps for different sets of input variables.

15. The method as claimed in claim 14, wherein the sets of input variables each contain identical input variables.

16. The method as claimed in claim 15, wherein the sets of input variables are formed by a time series of respectively identical input variables.

17. The method as claimed in claim 14, wherein said calculating comprises:
    producing provisional change rules for maps of corresponding sets of input variables; and
    calculating the change rule from mean values of the provisional change rules.

18. The method as claimed in claim 14, wherein at least one of the maps, for at least one of the input variables, has a transfer function which has a low gradient for large-magnitude values of the at least one of the input variables.

19. The method as claimed in claim 18, wherein at least one of the maps contains a number of map layers, starting with a first map layer, and the transfer function is provided in close proximity to the first map layer.

20. The method as claimed in claim 18, wherein the transfer function is a sigmoid transfer function.

21. The method as claimed in claim 14, wherein at least one of the maps is applied by a neural network.

22. The method as claimed in claim 21, wherein the input variables are linked via synthetic neurons to the at least one output variable produced by the at least one of the maps.

23. The method as claimed in claim 14, further comprising iteratively repeating said comparing, calculating and mapping.

24. The method as claimed in claim 14, wherein the maps have at least one common map part.

25. The method as claimed in claim 1, wherein the input variables contain speech features.

26. A system of speech processing, comprising:
    a map unit to map speech input variables with different weights onto at least one output variable produced by said mapping;
    comparison unit to compare the at least one output variable produced from said mapping with a desired output variable to be produced from said mapping to obtain a comparison result; and a calculation unit to calculate a change rule for said mapping based on the comparison result and to reduce the weights of selected input variables having little influence on the at least one output variable to a value greater than zero.

27. At least one computer readable medium storing at least one computer program for controlling a processor to perform a method comprising:

mapping input variables with different weights onto at least one output variable produced by said mapping;

comparing the at least one output variable produced from said mapping with a desired output variable to be produced from said mapping to obtain a comparison result; and calculating a change rule for said mapping based on the comparison result and to reduce the weights of selected input variables having little influence on the at least one output variable.

* * * * *